(12) United States Patent
Sasaki

(10) Patent No.: US 10,822,015 B2
(45) Date of Patent: Nov. 3, 2020

(54) STEERING SWITCH DEVICE

(71) Applicant: KABUSHIKI KAISHA TOKAI RIKA DENKI SEISAKUSHO, Aichi (JP)

(72) Inventor: Shinobu Sasaki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/150,865

(22) Filed: Oct. 3, 2018

(65) Prior Publication Data

US 2019/0106139 A1 Apr. 11, 2019

(30) Foreign Application Priority Data

Oct. 10, 2017 (JP) .................. 2017-196838

(51) Int. Cl.
| | | |
|---|---|---|
| *H01H 15/02* | (2006.01) | |
| *B62D 1/04* | (2006.01) | |
| *B62D 1/08* | (2006.01) | |
| *B62D 1/06* | (2006.01) | |
| *B60Q 3/283* | (2017.01) | |
| *B60Q 3/14* | (2017.01) | |

(52) U.S. Cl.
CPC .............. *B62D 1/046* (2013.01); *B60Q 3/14* (2017.02); *B60Q 3/283* (2017.02); *B62D 1/06* (2013.01); *B62D 1/08* (2013.01)

(58) Field of Classification Search
CPC ............... H01H 35/146; H01H 19/11; H01H 2003/008; H01H 2025/043; H01H 2215/05; H01H 9/168; H01H 13/84; H01H 21/22; H01H 2217/024; H01H 2221/012; H01H 2221/016; H01H 2231/026; H01H 25/04; B62D 1/043; B62D 1/04; B62D 1/046; B60Q 3/12; B60Q 3/14; B60Q 3/68; B60Q 3/51; B60Q 1/0082; B60Q 3/283
See application file for complete search history.

(56) References Cited

U.S. PATENT DOCUMENTS

| | | | | |
|---|---|---|---|---|
| 2010/0176579 A1* | 7/2010 | Gulde | ................. | B60R 21/2035 280/731 |
| 2012/0090973 A1* | 4/2012 | Liu | ........................ | H01H 3/125 200/5 A |
| 2012/0267221 A1* | 10/2012 | Gohng | .................... | G06F 3/016 200/61.54 |

FOREIGN PATENT DOCUMENTS

JP 2015-054564 A 3/2015

* cited by examiner

*Primary Examiner* — Ahmed M Saeed
(74) *Attorney, Agent, or Firm* — Roberts Calderon; Safran & Cole P.C.

(57) ABSTRACT

A steering switch device includes a housing disposed in a spoke portion of a steering wheel of a vehicle, the housing including an operation unit configured to operate an electronic device that is electrically connected, and an illumination unit provided in a side surface of the housing protruding from the spoke portion, the illumination unit being configured to illuminate a grip portion of the steering wheel.

10 Claims, 3 Drawing Sheets

STEERING SWITCH DEVICE

CROSS-REFERENCE TO RELATED APPLICATIONS

The present application is based on Japanese patent application No. 2017-196838 filed on Oct. 10, 2017, the entire contents of which are incorporated herein by reference.

TECHNICAL FIELD

The present invention relates to a steering switch device.

RELATED ART

In the related art, a vehicle steering handle including an illuminator arranged in at least a part of a rim portion of the vehicle steering handle, a detector that detects at least a state of the steering handle operated by a driver as a driving state of the vehicle, and a controller that controls a lighting state of the illuminator based on the detected driving state of the vehicle is known (see, for example, JP 2015-54564 A).

The illuminator of the vehicle steering handle directs a part of the emitted light toward the driver to give a warning to the driver.

SUMMARY

In the vehicle steering handle of the related art, however, the illuminator is disposed in a grip portion (rim portion), and consequently the accuracy of grip detection is reduced and/or decoration is limited when a function is provided to the grip portion by disposing a heater, by disposing a grip sensor that detects grip, and/or by applying decoration with wrapping leather, for example.

An object of the invention is to provide a steering switch device capable of illuminating a grip portion of a steering wheel while suppressing influence on a function provided to the grip portion.

A steering switch device according to an aspect of the invention includes a housing disposed in a spoke portion of a steering wheel of a vehicle, the housing including an operation unit configured to operate an electronic device that is electrically connected, and an illumination unit provided in a side surface of the housing protruding from the spoke portion, the illumination unit being configured to illuminate a grip portion of the steering wheel.

Advantageous Effect of the Invention

According to an aspect of the invention, the grip portion of the steering wheel can be illuminated while suppressing influence on a function provided to the grip portion.

DESCRIPTION OF EMBODIMENTS

Overview of Embodiments

A steering switch device according to an embodiment schematically includes a housing disposed in a spoke portion of a steering wheel of a vehicle and including an operation unit configured to operate an electronic device that is electrically connected, and an illumination unit provided in a side surface of the housing protruding from the spoke portion and configured to illuminate a grip portion of the steering wheel.

Since the illumination unit is not disposed in the grip portion, the steering switch device can illuminate the grip portion while suppressing influence on a function provided to the grip portion of the steering wheel in comparison with a case in which such a configuration is not employed.

Embodiment

Overview of Steering Switch Device 1

Figure 1A:
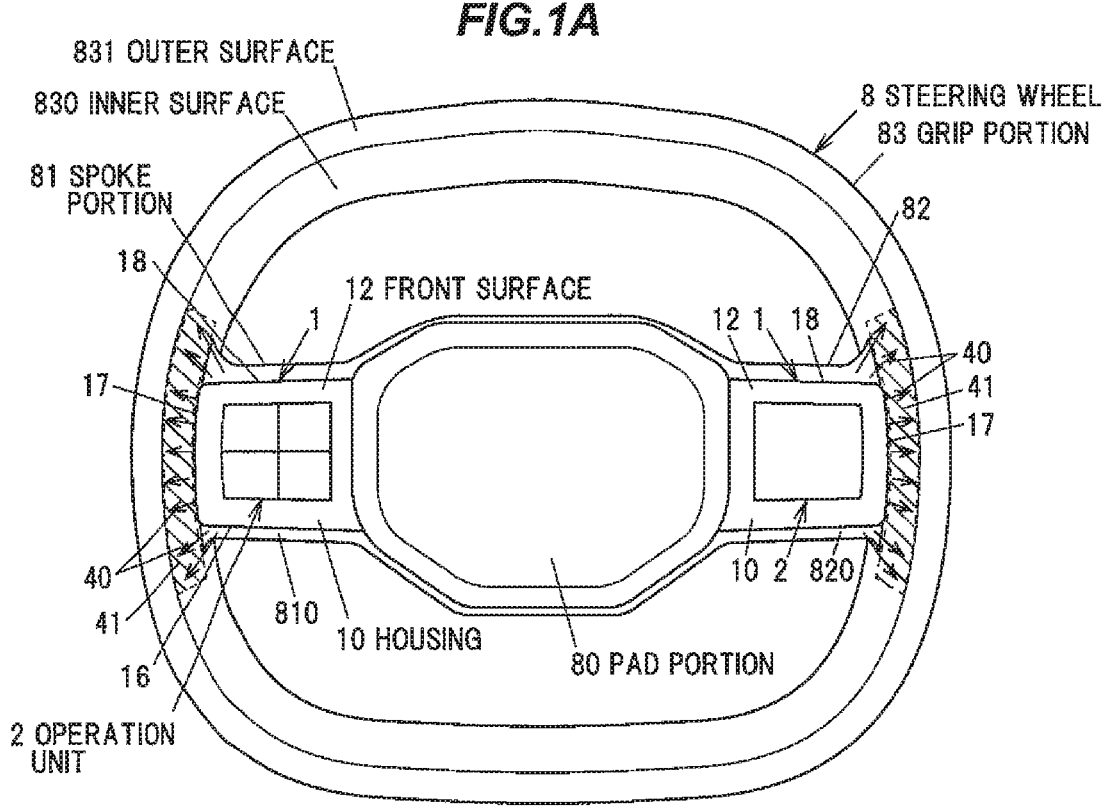
FIG. 1A is a schematic view of a steering wheel provided with an example of a steering switch device according to an embodiment.
Figure 1B:
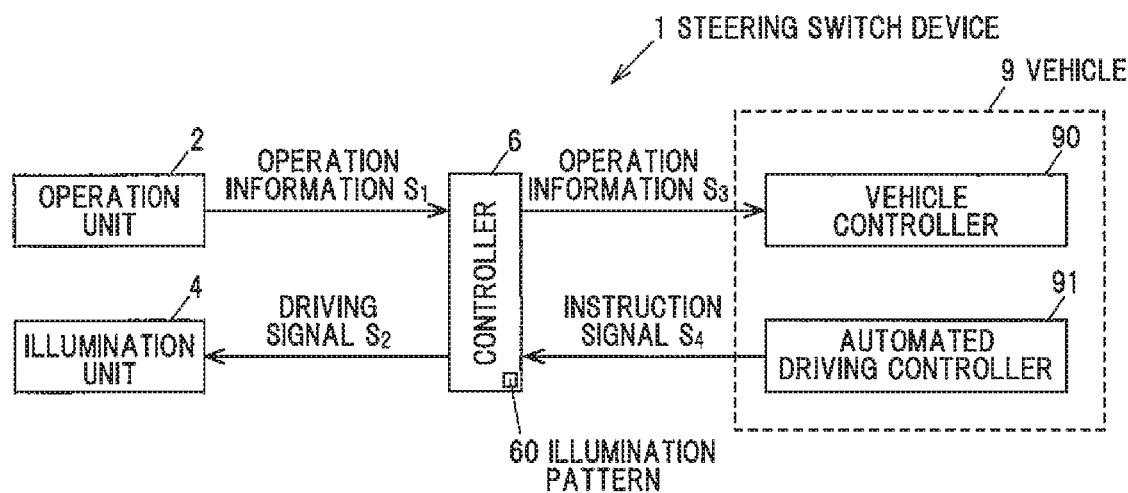
FIG. 1B is an example of a block diagram of a steering switch device.
Figure 2A:
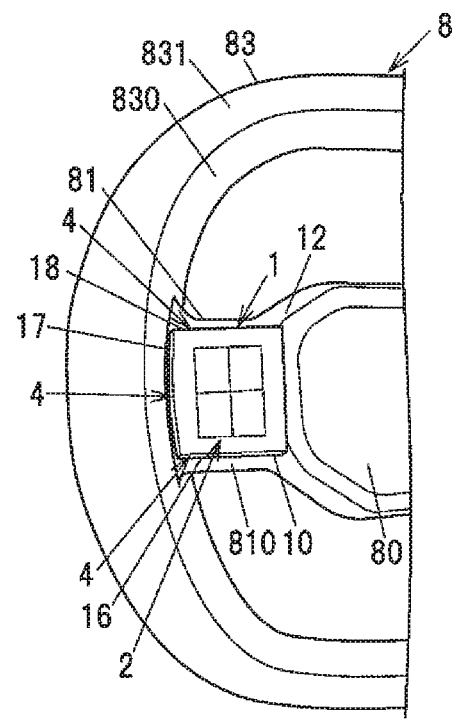
FIG. 2A is a perspective view illustrating an example of a steering switch device according to an embodiment.
Figure 2B:
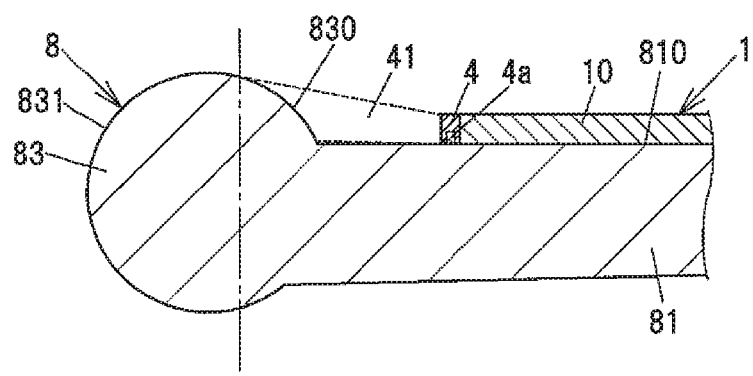
FIG. 2B is a cross-sectional view of a main part for describing an example of illumination with an illumination unit.
Figure 2C:
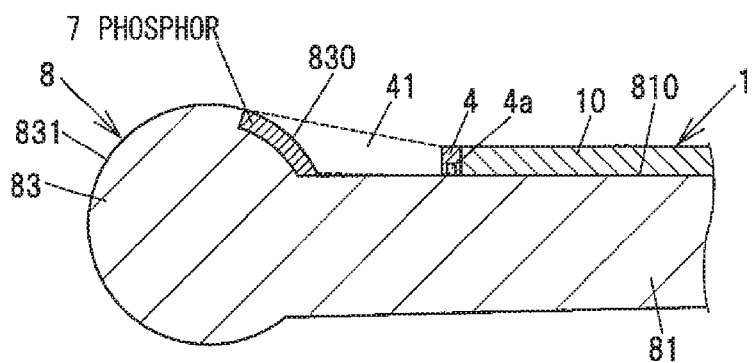
FIG. 2C is a cross-sectional view of a main part for describing an example of illumination of a modification.

FIG. 1A is a schematic view of a steering wheel provided with an example of a steering switch device according to an embodiment, and FIG. 1B is an example of a block diagram of a steering switch device. FIG. 2A is a perspective view illustrating an example of a steering switch device according to an embodiment, FIG. 2B is a cross-sectional view of a main part for describing an example of illumination with an illumination unit, and FIG. 2C is a cross-sectional view of a main part for describing an example of illumination of a modification. In the drawings associated with the following embodiments, ratios between elements in the drawings may be different from the actual ratios. In addition, in FIG. 1B, arrows indicate the flows of primary signals, information, and the like.

A steering switch device 1 is electrically connected with electronic devices provided in a vehicle 9, and is configured to be able to operate the electronic devices, for example. Examples of such electronic devices include navigation devices, audio and video playback devices, air conditioning devices, and the like.

As illustrated in FIG. 1A and FIG. 1B, the steering switch device 1 schematically includes, for example, a housing 10 disposed in a spoke portion of a steering wheel 8 of a vehicle 9 and including an operation unit 2 configured to operate electronic devices that are electrically connected, and an illumination unit 4 provided in a side surface of the housing 10 protruding from the spoke portion and configured to illuminate a grip portion 83 of the steering wheel 8.

The spoke portion of the present embodiment is, for example, a spoke portion 81 and a spoke portion 82 connecting a pad portion 80 and the grip portion 83 in the direction of 3 o'clock and 9 o'clock as illustrated in FIG. 1A. In the pad portion 80, a horn device, an air bag, and the like are disposed, for example. The steering switch device 1 is disposed in each of the spoke portion 81 and the spoke portion 82.

In addition, as illustrated in FIG. 1A, the illumination unit 4 is configured to illuminate an illumination region 41 including a portion where the spoke portion (the spoke portion 81 and the spoke portion 82) and the grip portion 83 are connected, for example. In the illumination unit 4, light-emitting elements 4a are disposed in a first side surface (side surface 17) facing the portion where the spoke portion (the spoke portion 81 and the spoke portion 82) and the grip portion 83 are connected, and in a second side surface (lower side surface 16) and a third side surface (upper side surface 18) that are connected with the first side surface (side surface 17).

The housing 10 may include a bezel on the outer side of the housing 10. In this case, the steering switch device 1 is configured to output illuminating light 40 from a side surface of the bezel in which the illumination unit 4 is disposed, for example.

As illustrated in FIG. 1B, the steering switch device 1 includes a controller 6 electrically connected with the operation unit 2 and the illumination unit 4, for example.

Configuration of Operation Unit 2

The operation unit 2 schematically includes a plurality of switches, a touch pad, and the like, for example. The operation unit 2 of the steering switch device 1 of the spoke portion 81 includes a plurality of switches, for example. In addition, the operation unit 2 of the steering switch device 1 of the spoke portion 82 includes a touch pad, for example.

As illustrated in FIG. 1A, the operation unit 2 is disposed in a front surface 12 of the housing 10, for example. In addition, the operation unit 2 is configured to generate operation information $S_1$ based on an operation performed on the operation unit 2 and output the operation information $S_1$ to the controller 6, for example.

The operation unit 2 is disposed at a position where an operator gripping the grip portion 83 can operate the operation unit 2. The region gripped in this state is included in the illumination region 41.

Configuration of Illumination Unit 4

The illumination unit 4 schematically includes a plurality of light-emitting elements 4a. The light-emitting element 4a is, for example, a light emitting diode (LED), a laser, an organic electro luminescence (EL) element or the like that outputs the illuminating light 40, which is visible light. The light-emitting elements 4a may be single-color or multi-color. As illustrated in FIG. 1B, the illumination unit 4 outputs the illuminating light 40 to the illumination region 41 based on a driving signal $S_2$ output from the controller 6, for example.

As illustrated in FIG. 2A, the housing 10 of the steering switch device 1 is disposed such that the upper part thereof protrudes from a front surface 810 of the spoke portion 81 and a front surface 820 of the spoke portion 82.

Clockwise from the lower side in FIG. 1A, a lower side surface 16, a side surface 17 and an upper side surface 18 of the housing 10 on the spoke portion 81 side protrude from the front surface 810, for example. Likewise, counterclockwise from the lower side in FIG. 1A, the lower side surface 16, the side surface 17 and the upper side surface 18 of the housing 10 on the spoke portion 82 side protrude from the front surface 820, for example.

The illumination unit 4 is disposed in the lower side surface 16, the side surface 17 and the upper side surface 18, and outputs the illuminating light 40 toward an inner surface 830 of the grip portion 83 from the lower side surface 16, the side surface 17 and the upper side surface 18. The inner surface 830 is an internal surface located on the front surface 810 side of the spoke portion 81, and an internal surface located on the front surface 820 side of the spoke portion 82, and the inner surface 830 can be illuminated from the side surface of the housing 10 as illustrated in FIG. 2B, for example.

In other words, the inner surface 830 is the surface on the right side of the dashed line serving as a boundary in FIG. 2B, for example. Further, while the inner surface 830 is divided into two portions by the spoke portion serving as a boundary, the inner surface on the front surface 810 side of the spoke portion 81 is the surface that serves as the illumination region 41. In addition, an outer surface 831 is the surface on the left side of the dashed line serving as a boundary in FIG. 2B, for example.

In the illumination unit 4, the plurality of light-emitting elements 4a are arranged side by side in the longitudinal direction of the side surface 17, for example. In the lower side surface 16 and the upper side surface 18, the light-emitting elements 4a are disposed on the grip portion 83 side in the illumination unit 4, for example. In addition, the light-emitting elements 4a in the lower side surface 16 and the upper side surface 18 may not be perpendicular to the side surface, and may be tilted toward the illumination region 41.

In addition, in the illumination unit 4 of a modification, an upper portion of the housing 10 may be projecting such that the light-emitting elements 4a cannot be easily directly seen from the operator. In addition, the illumination unit 4 of another modification may include a light guide that guides, to the illumination region 41, the illuminating light 40 output from the light-emitting elements 4a. In the case where the illumination unit 4 includes the light guide, illumination of the illumination region 41 and illumination of the operation unit 2 can be performed by the same light-emitting element 4a.

In the steering switch device 1 of yet another modification, a phosphor 7 may be disposed in the illumination regions 41 of the spoke portion 81 and the spoke portion 82 as illustrated in FIG. 2C, for example. The illumination unit 4 of this modification is configured to output, as the illuminating light 40, ultraviolet light that causes the phosphor 7 to emit light.

The phosphor 7 includes a fluorescent material such as yttrium-aluminum-garnet (YAG) fluorescent materials, terbium-aluminum-garnet (TAG) fluorescent materials, SIALON fluorescent materials, and barium-ortho-silicate (BOS) fluorescent materials, for example. In the case where the grip portion 83 is decorated with wrapping leather, the phosphor 7 may be disposed as a phosphor film on the grip portion 83, for example. This phosphor film is formed by partially diffusing a fluorescent material in a transparent resin material, for example.

Configuration of Controller 6

The controller 6 is, for example, a microcomputer constituted of a central processing unit (CPU) that carries out computations, processes, and the like on obtained data in accordance with stored programs, random access memory (RAM) and read-only memory (ROM) that are semiconductor memories, and the like. A program for operations of the controller 6 and an illumination pattern 60, for example, are stored in the ROM. The RAM is used as a storage region that temporarily stores computation results and the like, for example.

As illustrated in FIG. 1B, the controller 6 is connected with a vehicle controller 90 and an automated driving controller 91 of the vehicle 9 via a vehicle local area network (LAN) such as a controller area network (CAN) and a local interconnect network (LIN), for example. The vehicle controller 90 comprehensively controls sensors, devices, and the like of the vehicle 9, for example. The automated driving controller 91 controls automated driving, for example.

When the operation unit 2 of the steering switch device 1 is operated, the controller 6 generates operation information $S_3$ suitable for communication in accordance with operation information $S_1$ output from the operation unit 2 and outputs the operation information $S_3$ to the vehicle controller 90 via the vehicle LAN, for example. The vehicle controller 90 executes movement of a cursor, scroll of a map image, setting of a numerical value of a function of a setting object, and the like displayed on a display device based on the received operation information $S_3$, for example.

In addition, the controller 6 controls the illumination unit 4 based on an instruction signal $S_4$ output from the automated driving controller 91 via the vehicle LAN, for example. When the vehicle 9 is shifted from automated driving to manual driving, and/or when a notification is performed during automated driving, the illumination unit 4 illuminates the illumination region 41 including the portion where the grip portion 83, and the spoke portion 81 and the spoke portion 82, are connected, for example.

Such illumination in the illumination region 41 is performed for notification of switching from automated driving to manual driving. That is, for the purpose of prompting the operator to grip the grip portion 83, which is required for performing manual driving, the region to be gripped by the operator is illuminated. The illumination of the illumination region 41 may be performed as notification during automated driving.

When a shift period of switching from automated driving to manual driving arrives, the automated driving controller 91 generates an instruction signal $S_4$ instructing a start of illumination and outputs the instruction signal $S_4$ to the steering switch device 1. In addition, when switching from automated driving to manual driving, the automated driving controller 91 generates an instruction signal $S_4$ instructing a stop of illumination and outputs the instruction signal $S_4$ to the steering switch device 1.

The illumination of the illumination region 41 is performed in accordance with an illumination pattern 60, for example. The illumination pattern 60 is a pattern in which light is continuously emitted until an instruction signal $S_4$ instructing a stop of illumination is input, a pattern in which lighting and blinking are repeated, a pattern in which light is emitted in a flowing fashion in one direction, a pattern in which the colors of the light-emitting elements 4a are changed, a pattern combining multiple patterns, and the like.

Figure 3:
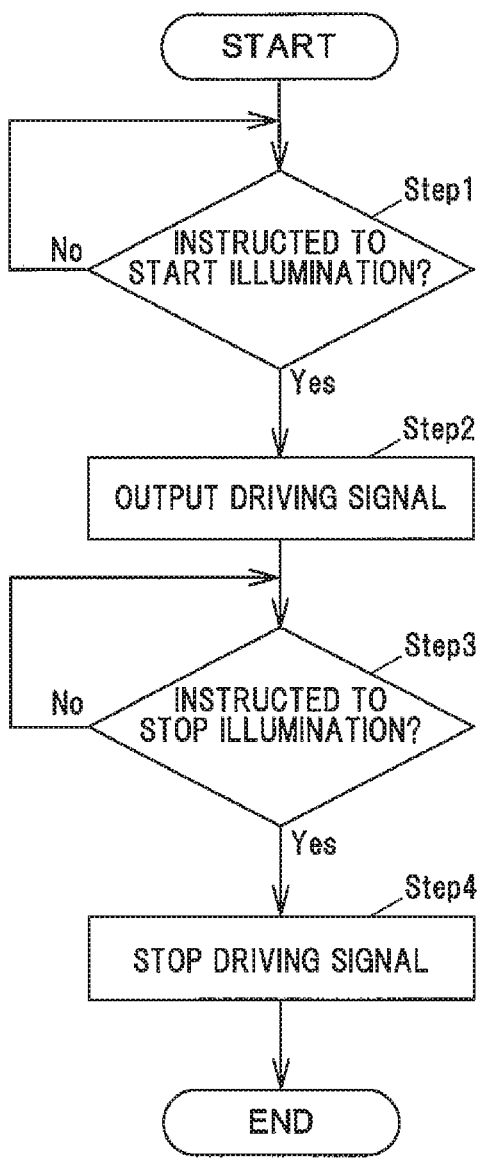
FIG. 3 is a flowchart illustrating an example of operations of a steering switch device according to an embodiment.

An example of operations of the steering switch device 1 of the present embodiment is described below with reference to the flowchart of FIG. 3. Here, operations in switching from automated driving to manual driving are described.

Operation

In the case of "Yes" at step 1, that is, when an instruction signal $S_4$ instructing a start of illumination is received from the automated driving controller 91 via the vehicle LAN (Step 1: Yes), the controller 6 of the steering switch device 1 generates a driving signal $S_2$ based on the illumination pattern 60 and outputs the driving signal $S_2$ to the illumination unit 4, thereby illuminating the illumination region 41 (Step 2).

Next, in the case of "Yes" at step 3, that is, when an instruction signal $S_4$ instructing a stop of illumination is input from the automated driving controller 91 via the vehicle LAN (Step 3: Yes), the controller 6 stops the output of the driving signal $S_2$ and stops the illumination of the illumination region 41 (Step 4).

Effect of Embodiments

The steering switch device 1 according to the present embodiment can illuminate the grip portion 83 while suppressing influence on the function provided to the grip portion 83 of the steering wheel 8. To be more specific, since the illumination unit 4 is not disposed in the grip portion 83, the steering switch device 1 can illuminate the grip portion 83 while suppressing influence on a function provided to the grip portion 83 of the steering wheel 8 in comparison with a case in which such a configuration is not employed.

Since the steering switch device 1 illuminates the illumination region 41 including the portion where the spoke portion and grip portion are connected, the gripping region can be illuminated and the operator can easily recognize the switching from automated driving to manual driving in comparison with the case in which such a configuration is not employed.

Although several embodiments of the invention and a modified example thereof have been described above, these embodiments and modified example are merely examples, and the invention according to claims is not intended to be limited thereto. Such novel embodiments and a modified example can be implemented in various other forms, and various omissions, substitutions, changes, and the like can be made without departing from the spirit and scope of the invention. In addition, all combinations of the features described in these embodiments and modified example are not necessary to solve the problem of the invention. Furthermore, these embodiments and modified example are included within the spirit and scope of the invention and also within the invention described in the claims and the scope of equivalents thereof.

REFERENCE SIGNS LIST

1 Steering switch device
2 Operation unit
4 Illumination unit
4a Light-emitting element
6 Controller
7 Phosphor
8 Steering wheel
9 Vehicle
10 Housing
12 Front surface
16 Lower side surface
17 Side surface
18 Upper side surface
40 Illuminating light
41 Illumination region
60 Illumination pattern
80 Pad portion
81 Spoke portion
82 Spoke portion
83 Grip portion
90 Vehicle controller
91 Automated driving controller
810 Front surface
820 Front surface
830 Inner surface
831 Outer surface

The invention claimed is:

1. A steering switch device, comprising:
a housing disposed in a spoke portion of a steering wheel of a vehicle, the housing including an operation unit configured to operate an electronic device that is electrically connected; and
an illumination unit provided in a side surface of the housing protruding from a driver facing surface of the spoke portion, wherein the illumination unit is disposed facing an inner surface of a grip portion of the steering wheel so as to illuminate the inner surface above the driver facing surface of the spoke portion, and wherein the illumination unit is spaced apart from the inner surface of a grip portion of the steering wheel by an air gap that forms an illumination area of the steering wheel.

2. The steering switch device according to claim 1, wherein the illumination unit is configured to illuminate an illumination region including a portion where the spoke portion and the grip portion are connected.

3. The steering switch device according to claim 2, wherein a phosphor is disposed in the illumination region of the spoke portion, and the illumination unit is configured to output ultraviolet light that causes the phosphor to emit light.

4. The steering switch device according to claim 1, wherein in a case where the vehicle is shifted from automated driving to manual driving and/or in a case where a notification is performed during automated driving, the illumination unit is configured to illuminate an illumination region including a portion where the spoke portion and the grip portion are connected.

5. The steering switch device according to claim 1, wherein in the illumination unit, a light-emitting element is disposed in a first side surface facing a portion where the spoke portion and the grip portion are connected, and in a second side surface and a third side surface that are connected with the first side surface.

6. The steering switch device according to claim 1, wherein the illumination unit is configured to illuminate an illumination region including a portion of the grip portion opposing the side surface of the housing.

7. The steering switch device according to claim 1, wherein an upper portion of the housing projects such that the illumination unit cannot be directly seen from an operator.

8. The steering switch device according to claim 6, wherein the illumination region is configured to be illuminated by a same light-emitting element as the operation unit.

9. The steering switch device according to claim 8, wherein the illumination unit comprises a light guide to guide a light from the light-emitting element.

10. The steering switch device according to claim 8, wherein the light-emitting element is configured to emit a visible light or an ultraviolet light.

* * * * *